United States Patent Office 3,284,900
Patented Nov. 15, 1966

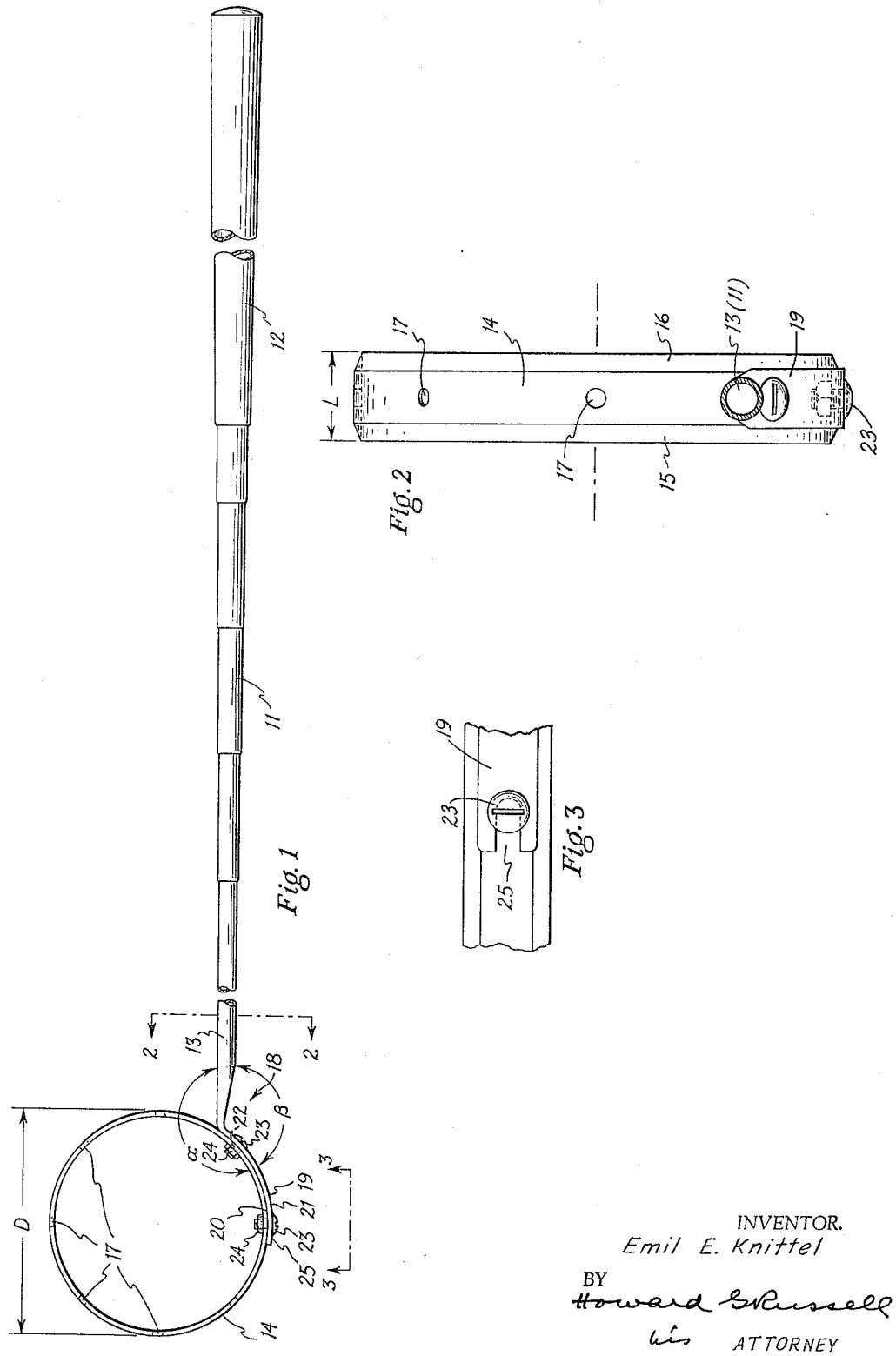

3,284,900
PLANT CUTTING TOOLS
Emil E. Knittel, 6 St. James Place, Hempstead, N.Y.
Filed June 29, 1964, Ser. No. 378,605
9 Claims. (Cl. 30—318)

This invention relates to manual cutting tools for plants, particularly weeds and provides an improved tool of the so-called whip variety, consisting essentially of a shaft on the end of which a cutting element is mounted.

The tool or whip is swung in a manner comparable to a golf club and the energy required for the cutting operation proper is derived from the momentum of the fast moving blade.

The conventional weed whips are fitted with a substantially flat blade set at such an angle to the shaft as to pass over level ground in a position substantially parallel to the ground and, accordingly, cut a wide swath or path. They are not suited for the selective removal of individual plants, or weeds, for this reason.

In the tending of lawns it is important to remove broad-leafed weeds selectively, as they tend to cover a comparatively large circular area within which they smother the grass. It is common practice to remove such weeds by digging them out, pulling them out or cutting their roots, all of which operations require bending over or kneeling down.

The present invention provides a whip type implement for the selective removal of weed plants, or individual plants in general, without trimming down the adjacent growth.

Essentially this is accomplished by a tubular cutting element which may be single-edged, but preferably is double-edged.

In describing and defining the present invention, the word tubular is used in its broadest sense without the often implied limitation that a tube is normally cylindrical. It need not be, but may resemble a pentagon, hexagon, octagon, oval or ellipse in cross section, and the term tubular is used in this broader sense in describing and defining the present invention.

Thus the cutting element which is conveniently cylindrical, may also be of polygonal or oval cross section so as to cut a U swath, a swath resembling a V and so forth.

In this connection I am aware that it is known to mount a flexible blade on the end of a shaft in line with the shaft and then to pull up the end of the blade by a suitable tie rod to impart a curved shape to the blade which, when under tension, resembles that of a conventional weed whip except that its blade is arched. The known construction is not suited for the selective removal of plants and cuts a wide swath.

The objects, features and advantages of this invention will appear more fully from the detailed description which follows accompanied by drawings showing, for the purpose of illustration, a preferred embodiment of the invention. The invention also resides in certain new and original features of construction and combination of elements hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

FIG. 1 is an elevational view of a preferred form of weed cutter embodying this invention;

FIG. 2 is a plan view, partly in section, taken on line 2—2 of FIG. 1; and

FIG. 3 is a fragmentary view on line 3—3 of FIG. 1.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of construction for the purpose of explanation of broader aspects of the invention but it should be understood that structural details may be modified in various respects without departure from the principles of the invention and that the invention may be incorporated in other structural forms than shown.

The shaft 11 of the device or tool shown in FIG. 1 is preferably tapered or stepped and comprises a handle portion 12 of largest diameter, the diameter of the shaft diminishing gradually towards the other end 13 to which the tubular cutting element 14 is secured.

In the illustrated embodiment the cutting element is of cylindrical cross section, although, as previously mentioned, a hexagonal, pentagonal or any other polygonal shape, as well as an elliptical cross section may be chosen.

The illustrated cutting element 14 is of a diameter D which is a multiple of its length L. Both terminal edges 15 and 16 are sharpened to provide oppositely facing cutting edges, although it is also satisfactory to provide a single edge only.

As will later be seen, the cutting element is reversible, so that even a single edged element can be appropriately mounted to serve a right or a left-handed person.

Preferably the sharpening is done by providing an outside bevel as shown. This arrangement further contributes to reducing the length of the swath cut, the cylindrical curvature limiting the width of the swath.

The cutting element is preferably made from seamless tubular spring stock, but it is also satisfactory to bend an originally flex blade into tubular or polygonal shape and join the ends, for example by welding.

A plurality of preferably evenly spaced mounting holes 17 are provided about the periphery, there being eight in the illustrated example. Any two adjoining holes may be used in the mounting of the cutting element on the shaft.

As seen in FIG. 1, the end of the shaft 11 is angled at 18 and the end 19 of the shaft is flattened and curved to fit the cutting element. The concave side 20 forms an angle $\alpha$ with respect to the shaft 11, the angle $\alpha$ being larger than the angle $\beta$ between the convex side 21 and the shaft 11, due to the bend at 18.

The shaft end 19 has a hole 22 extending through it through which a bolt 23 passes carrying a nut 24. The end of the shaft portion 19 is preferably slotted at 25 and a second bolt 23 and nut 24 secure the cutting element to the slotted end.

It is readily apparent that the cutting element may be attached to the shaft in any one of eight clock-dial positions bringing eight different edge portions into the actual cutting position. Thus after dulling of the original edge portion the same cutting end of the cutting element provides seven additional sharp blade portions which may be used up in succession. Thereafter the cutting element may be reversed to provide eight further keen edge portions.

After all available edge portions are dulled—sixteen in the illustrated example—the tubular element is either replaced or resharpened.

Due to the relatively small size of the cutting element— a diameter of 4" and a length of ¾" being representative—the tool is easy to aim, has a favorable weight distribution, and is admirably suited for spot-removing weeds without disturbing surrounding growth.

In use it is swung like a golf club and, unlike conventional flat-bladed weed whips, its shaft does not tend to turn or twist in the users' hands.

Experience has shown that the roots of objectionable weeds die if their foliage is kept trimmed at about surface level by the described tool.

What is claimed is:

1. A weed cutting tool comprising, in combination, a shaft, one end of the shaft being a handle portion, the other end of the shaft being a mounting portion; and a cutter secured to the mounting portion, the cutter being a tubular element the opposite ends of which are sharpened to provide oppositely facing cutting edges extending around 360 degrees of the circumference thereof, the central axis of the cutter being transverse to the shaft, the length of the tool being substantially equal to that of a golf club, and the mounting portion extending in contact with the cutter periphery for a portion of the cutter circumference.

2. A weed cutting tool comprising, in combination, a shaft, a tubular cutting element having oppositely facing cutting edges, said element comprising a plurality of mounting holes; and means for removably securing said cutting element to one end of said shaft in any one of a plurality of clock-dial positions, such that the central axis of the tubular element is transverse to the shaft.

3. A weed cutting tool comprising, in combination, a shaft; a tubular cutting element at least one end of which is sharpened to provide a curved endless cutting edge; and means for removably securing said element to one end of said shaft in any one of a plurality of clock-dial positions of the cutter with respect to the shaft and such that the central axis of the cutter is substantially at right angles to the direction of the shaft.

4. A weed cutting tool comprising, in combination, a shaft; a tubular cutting element both ends of which are sharpened to provide oppositely facing cutting edges; and means for removably securing said element to one end of said shaft in any one of a plurality of clock-dial positions of the cutter with respect to the shaft and such that the central axis of the cutter is substantially at right angles to the direction of the shaft.

5. A weed cutting tool comprising, in combination, a shaft; a double edged cutting blade curved to form an endless closed ring-shaped structure; and means for removably securing said blade to one end of the shaft in any one of a plurality of clock-dial positions of the ring with respect to the shaft and such that the central axis of the ring is transverse to the direction of the shaft.

6. A weed cutting tool comprising, in combination, a shaft, one end of which is shaped as a handle; and a tubular cutting element of a length which is less than its diameter, opposite ends of the element being sharpened to provide oppositely facing cutting edges, said element having a plurality of mounting holes in its circumference; and means for attaching said element to the other end of said shaft at any two of its mounting holes with the axis of the element at right angles to the shaft.

7. A weed cutting tool as set forth in the preceding claim 6 in which the mounting holes are evenly spaced from one another.

8. A weed cutting tool comprising, in combination, a shaft, one end of which is angled with respect to the remainder of the shaft, the said remainder being straight, the angled end being curved to fit the peripheral wall of the cutting element hereinafter recited, the wall contacting the entire curved end substantially to the apex of the angle; a tubular cutting element of a length which is less than its diameter, opposite ends of the tubular cutting element being sharpened to provide oppositely facing cutting edges about the entire peripheral edge thereof; and means for securing said element to the curved angled end of the shaft with the axis of said element transverse to said shaft, the central axis of the tube being offset with respect to the shaft axis.

9. A weed cutting tool as set forth in the preceding claim 8 in which said securing means comprise two bolts, one bolt extending through a first hole in the circumference of the cutting element and a further hole in said angled shaft portion, the other bolt extending through a second hole in the circumference of the cutting element and an open ended slot in said angled shaft portion.

References Cited by the Examiner

UNITED STATES PATENTS

| 1,785,443 | 12/1930 | Fisher | 30—318 |
| 1,823,672 | 9/1931 | Tilden | 30—318 |
| 1,992,287 | 2/1935 | Byars | 30—318 |
| 2,447,301 | 7/1948 | Wright | 30—320 X |
| 2,710,445 | 6/1955 | Fitzpatrick | 30—40.1 |
| 2,718,700 | 9/1955 | Stecher | 30—318 |
| 2,787,058 | 4/1957 | Vogel | 30—318 |
| 2,827,657 | 3/1958 | Bettcher | 146—203 X |

WILLIAM FELDMAN, *Primary Examiner.*

G. WEIDENFELD, *Assistant Examiner.*